United States Patent
Fukushi et al.

(10) Patent No.: US 12,548,617 B2
(45) Date of Patent: Feb. 10, 2026

(54) DRAM CIRCUIT

(71) Applicant: Renesas Electronics Corporation, Tokyo (JP)

(72) Inventors: Tetsuo Fukushi, Tokyo (JP); Hiroyuki Takahashi, Tokyo (JP); Muneaki Matsushige, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 133 days.

(21) Appl. No.: 18/518,302

(22) Filed: Nov. 22, 2023

(65) Prior Publication Data
US 2024/0177767 A1 May 30, 2024

(30) Foreign Application Priority Data
Nov. 24, 2022 (JP) .................................. 2022-187012

(51) Int. Cl.
| | | |
|---|---|---|
| *G11C 11/4096* | (2006.01) | |
| *G11C 11/4072* | (2006.01) | |
| *G11C 11/408* | (2006.01) | |
| *G11C 11/4093* | (2006.01) | |

(52) U.S. Cl.
CPC ...... *G11C 11/4096* (2013.01); *G11C 11/4072* (2013.01); *G11C 11/408* (2013.01); *G11C 11/4093* (2013.01)

(58) Field of Classification Search
CPC ............ G11C 11/4096; G11C 11/4072; G11C 11/408; G11C 11/4093; G11C 11/4097; G11C 2207/005; G11C 11/4076; G11C 11/4091; G11C 11/4085; G11C 11/4094
See application file for complete search history.

(56) References Cited

U.S. PATENT DOCUMENTS

| | | | | |
|---|---|---|---|---|
| 5,590,086 A | * | 12/1996 | Park | G11C 11/406 365/230.03 |
| 6,279,116 B1 | * | 8/2001 | Lee | G11C 11/4076 713/600 |
| 8,559,254 B2 | * | 10/2013 | Kim | G11C 11/4094 365/210.12 |
| 2002/0040989 A1 | * | 4/2002 | Otsuka | G11C 29/50 257/296 |

FOREIGN PATENT DOCUMENTS

JP 2003-151275 A 5/2003

OTHER PUBLICATIONS

Takao Nakano and Yoichi Akasaka, "ULSI DRAM technology," Science Forum Co., Ltd., pp. 44-49, 1992. Concise explanation of relevance is found in the "Background" section of the specification.

* cited by examiner

*Primary Examiner* — Jay W. Radke
(74) *Attorney, Agent, or Firm* — Rimon P.C.

(57) ABSTRACT

A current consumption in a DRAM circuit is reduced. The DRAM circuit is a dynamic random access memory (DRAM) circuit provided with a main input/output line pair and a reset circuit. A potential of the main input/output line pair is held in a period from an end of a write cycle to a start of a first write cycle after the write cycle or a period from the end of the write cycle to a start of a first read cycle after the write cycle. The reset circuit resets a state of the main input/output line pair at a time of the start of the first read cycle.

5 Claims, 13 Drawing Sheets

DRAM CIRCUIT

CROSS-REFERENCE TO RELATED APPLICATIONS

The disclosure of Japanese Patent Application No. 2022-187012 filed on Nov. 24, 2022 including the specification, drawings and abstract is incorporated herein by reference in its entirety.

BACKGROUND

The present invention relates to a dynamic random access memory (DRAM) circuit.

A semiconductor chip mounted with a DRAM circuit incudes a pair of main input/output lines that is wired so as to longitudinally traverse the semiconductor chip. The pair of main input/output lines is also referred to as an MIO or a pair of differential I/O buses. In a case in which data is read out from the DRAM circuit, a minute differential potential between a pair of bit lines is amplified by a sense amplifier, and the differential potential is transmitted to the pair of main input/output lines. In a case in which data is written into the DRAM circuit, a write amplifier causes a potential difference between the pair of main input/output lines to have a full amplitude. Then, data of the pair of bit lines is forcibly rewritten.

There are disclosed techniques listed below.
[Patent Document 1] Japanese Unexamined Patent Application Publication No. 2003-151275
[Non-Patent Document 1] "ULSI DRAM technology" edited by Takao Nakano and Yoichi Akasaka, Science Forum Corporation.

The pair of main input/output lines is precharged after the end of a read cycle and the end of a write cycle (for example, see Patent Document 1 and Non-Patent Document 1). Hence, after the end of the read cycle and the end of the write cycle, the pair of main input/output lines is always reset, and the next cycle is constantly started from the same state.

SUMMARY

In recent years, as a cash memory for use in artificial intelligence (AI) and a mobile device, in place of a static random access memory (SRAM), use of a custom DRAM has been demanded.

In a memory for such uses, a row address is frequently switched by a random access. Accordingly, a frequency of sequentially operating a column address strobe (CAS) signal only with the same row address multiple times is low, so that an effect of reduction in power due to the sequential CAS operation is small. Also, a multi-bit high-speed operation is required in the DRAM circuit, causing large power loss attributable to data transfer.

Other objects and novel features of the present invention will be apparent from the description of the present specification and the accompanying drawings.

According to one embodiment of the present disclosure, a DRAM circuit provided with a main input/output line pair and a reset circuit. A potential of the main input/output line pair is held in a period from an end of a write cycle to a start of a first write cycle after the write cycle or a period from the end of the write cycle to a start of a first read cycle after the write cycle. The reset circuit resets a state of the main input/output line pair at a time of the start of the first read cycle.

According to the one embodiment, it is possible to reduce a current consumption in a DRAM circuit.

DETAILED DESCRIPTION

Figure 1:
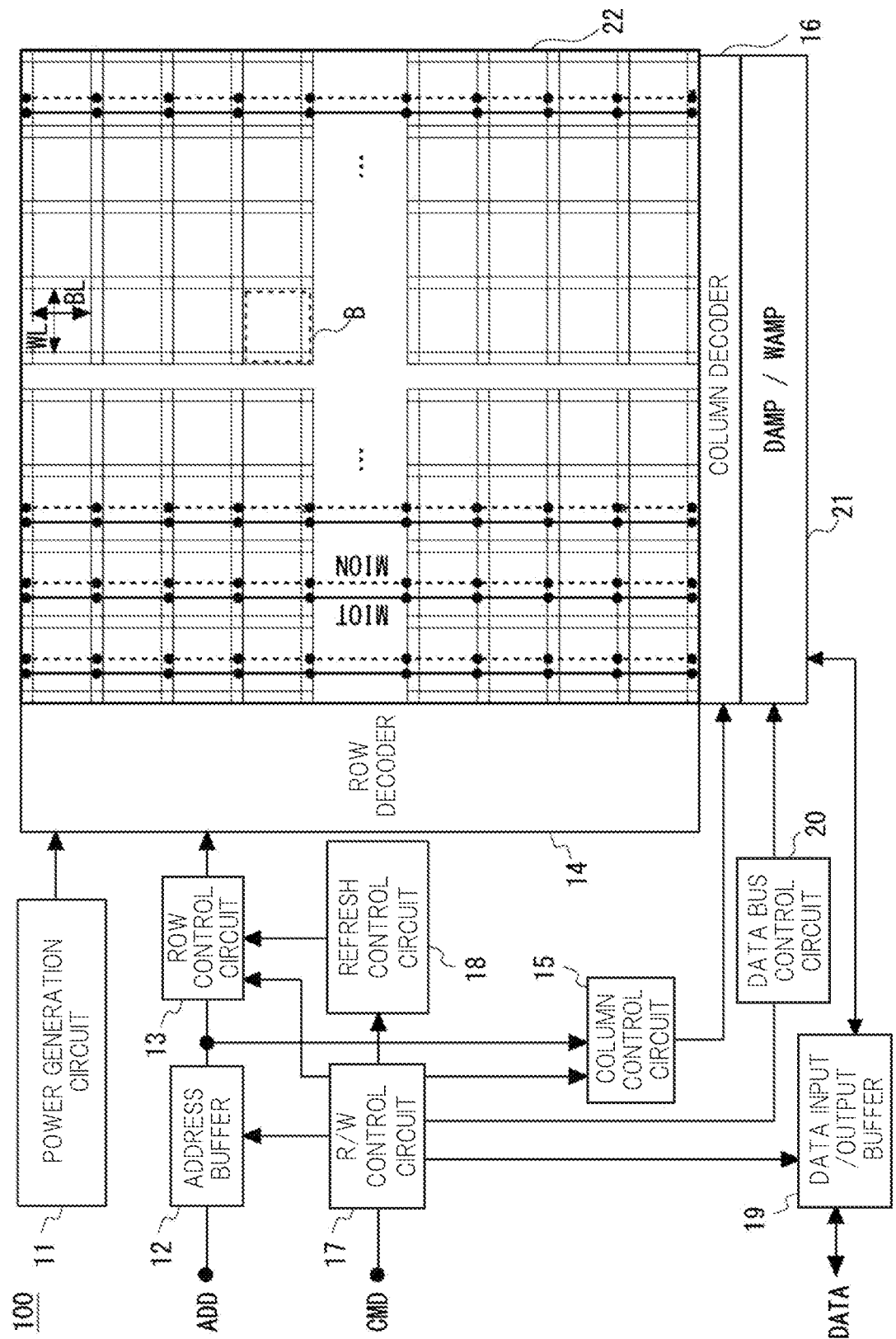
FIG. 1 is a diagram showing an overall configuration of a typical DRAM circuit.

For clarification of explanation, the following descriptions and drawings are appropriately omitted and simplified. In addition, elements indicated in the drawings as functional blocks for performing various processing operations can be configured by hardware such as a central processing unit (CPU), a memory, or other circuits or implemented by software such as a program loaded into the memory. Therefore, these functional blocks can be implemented in various forms by hardware only, software only, or hardware and software in combination, as can be understood by those skilled in the art. The functional blocks are not limited to any of these. Note that the same elements illustrated in the drawings are given the same reference signs, and overlapping description is omitted as appropriate.

Background Reaching Embodiment

First, with reference to FIG. 1 to FIG. 7, an operation of a typical DRAM circuit 100 will be described. FIG. 1 is a diagram showing an overall configuration of the DRAM circuit 100. The DRAM circuit 100 includes a power generation circuit 11, an address buffer 12, a row control circuit 13, a row decoder 14, a column control circuit 15, a column decoder 16, a read/write (R/W) control circuit 17, a refresh control circuit 18, a data input/output buffer 19, a data bus control circuit 20, a DAMP/WAMP 21, and a cell plate 22.

The power generation circuit 11 generates power to be used in the DRAM circuit 100. The address buffer 12 receives an input of an address signal ADD. The row control circuit 13 inputs a row address to the row decoder 14 according to the address signal ADD, and selects a relevant row. The column control circuit 15 inputs a column address to the column decoder 16 according to the address signal ADD, and selects a relevant column. The R/W control circuit 17 receives an input of a command CMD. The R/W control circuit 17 controls operations of the row control circuit 13, the column control circuit 15, and the refresh control circuit 18, according to the command CMD. The refresh control circuit 18 causes the row control circuit 13 to execute a refresh operation. The data input/output buffer 19 temporarily stores data received from the outside as write data. Also, the data input/output buffer 19 temporarily stores read data received from the DAMP/WAMP 21 to output the read data as data. A bus connecting the data input/output buffer 19 with the DAMP/WAMP 21 is called a read/write bus RWBS.

Main input/output line pairs MIOT and MION are disposed so as to extend in a column direction across the cell plate 22. The main input/output line pairs MIOT and MION each have a large wire length. The main input/output line pair MIOT and MION is provided for each column or for each set of two or more of columns. The cell plate 22 is divided into a plurality of blocks B. Each of the blocks B includes a memory cell array. Word lines WL extend in a row direction, and bit lines BL extend in the column direction.

Figure 2:
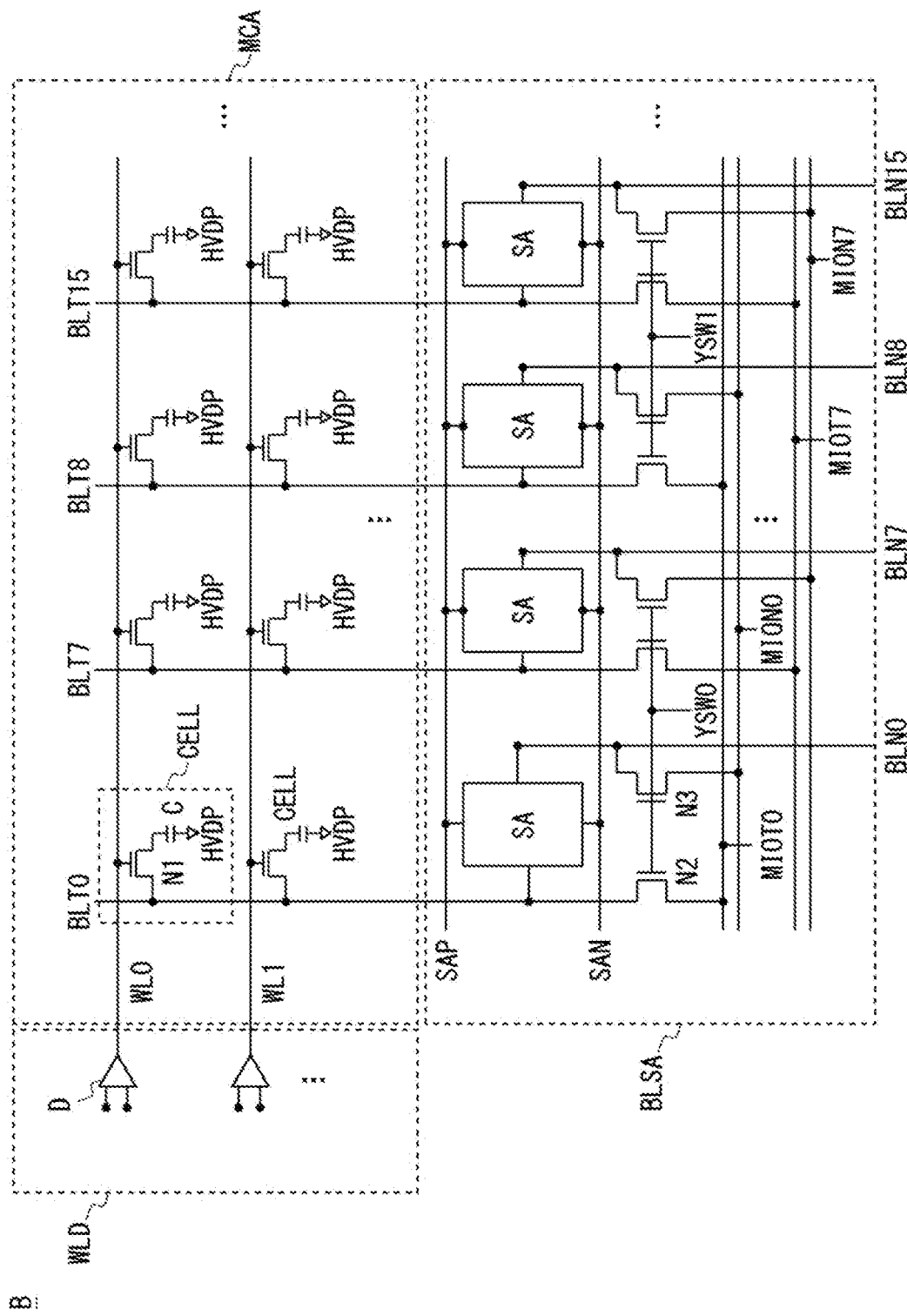
FIG. 2 is an explanatory diagram showing a configuration of a block including a memory cell array.

FIG. 2 is an explanatory diagram showing a block B including a memory cell array. The block B includes a word line driver WLD, a memory cell array MCA, and a bit line sense amplifier section BLSA.

The word line driver WLD includes drivers D driving respective word lines WL (e.g., WL0 and WL1). Each of the word lines WL according to an output of the row decoder 14 is driven by a corresponding one of the drivers D.

The memory cell array MCA includes a plurality of cells CELL. Each of the cells CELL has an nMOS transistor N1 and a capacitor C. The nMOS transistor N1 and the capacitor C are connected in series between the bit line BLT (e.g., BLT0, BLT7, BLT8, or BLT15) and a power supply HVDP. A gate of the nMOS transistor N1 is connected to the word line WL.

The bit line sense amplifier section BLSA includes plurality of sense amplifiers SA, a plurality of nMOS transistors N2, and a plurality of nMOS transistors N3.

Each of the sense amplifiers SA is connected to signals SAP and SAN which control whether the sense amplifier SA is enabled. The sense amplifier SA amplifies a differential potential between the bit line BLT and the bit line BLN (e.g., BLN0, BLN7, BLN8, or BLN15).

A source and a drain of the nMOS transistor N2 are connected to the bit line BLT and the main input/output line MIOT (e.g., MIOT0 or MIOT7), respectively. A source and a drain of the nMOS transistor N3 are connected to the bit line BLN and the main input/output line MION (e.g., MION0 or MION7), respectively. A gate of the nMOS transistor N2 and a gate of the nMOS transistor N3 each receive an input of column selection signals YSW (e.g., YSW0 or YSW1). The bit line pair BLT and BLN in a column selected by the column selection signal YSW is connected to the main input/output line MIOT and the main input/output line MION, respectively. That is, the nMOS transistor N2 and the nMOS transistor N3 operate as switches controlled by the column selection signal YSW. The column selection signal YSW according to an output of the column decoder 16 causes the nMOS transistor N2 and the nMOS transistor N3 to be put into a conductive state. The main input/output line pair MIOT and MION is shared by the plurality of sense amplifiers SA. The column selected by the column selection signal YSW is connected to the main input/output line pair MIOT and MION.

In a case in which data is read out from the DRAM circuit 100, the memory cell CELL is driven in the word line WL selected by the row address. The memory cell CELL generates a minute differential potential between the bit lines BLT and BLN. The sense amplifier SA amplifies the minute differential potential (also referred to as a potential difference). The amplified differential potential is transmitted to the main input/output line pair MIOT and MION, through the respective switches selected by the column address. The differential potential having a small amplitude, which is transmitted to the main input/output line pair MIOT and MION, is amplified by a data amplifier DAMP included in the DAMP/WAMP 21. The differential potential thus amplified is read out as data of 0 or 1.

In a case in which data is written into the DRAM circuit 100, a write amplifier WAMP included in the DAMP/WAMP 21 causes a potential of the main input/output line pair MIOT and MION to fluctuate at a full amplitude. Data of the bit line pair BLT and BLN whose potential is amplified by the sense amplifier SA is rewritten forcibly, so that the data is written into the memory cell CELL.

As described above, in the conventional technique, the main input/output line pair MIOT and MION is precharged after the end of a read cycle and after the end of a write cycle.

Figure 3:
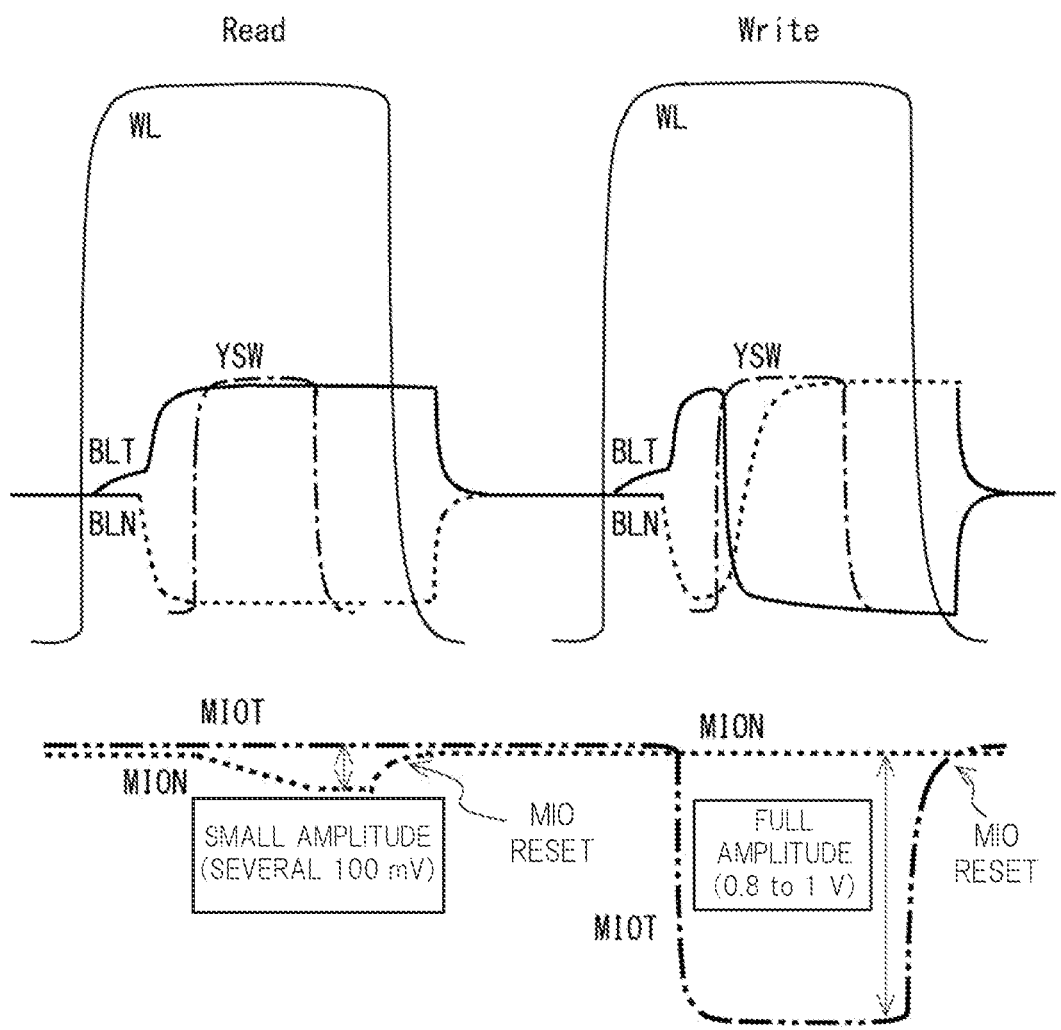
FIG. 3 is an explanatory diagram showing an operation of resetting a pair of main input/output lines.

FIG. 3 is an explanatory diagram showing an operation of resetting the main input/output line pair MIOT and MION after the end of the write cycle and after column selection during the read cycle. A horizontal direction represents time, and a longitudinal direction represents a potential. An upper side of the figure illustrates a potential of the word line WL, a potential of the bit line BLT, a potential of the bit line BLN, and a potential of the column selection signal YSW. A lower side of the figure illustrates a potential of the main input/output line MIOT and a potential of the main input/output line MION. The potential of the word line WL is indicated with a solid line. The potential of the bit line BLT and the potential of the bit line BLN are indicated with a solid line and a dash line, respectively. The column selection signal YSW is indicated with an alternate long and short dash line. The potential of the main input/output line MIOT and the potential of the main input/output line MION are indicated with an alternate long and two short dash line and a dash line, respectively.

First, the read cycle (Read) will be described. When the word line WL is driven in the read cycle, a differential potential is generated between the bit line pair BLT and BLN. When the column selection signal YSW rises, a differential potential having a small amplitude (several hundred millivolts) is generated between the main input/output line pair MIOT and MION. Then, after the column selection signal YSW becomes "0", the main input/output line MION is precharged, so that the state of the main input/output line pair MIOT and MION is reset.

Next, the write cycle (Write) will be described. When the word line WL is driven in the write cycle, a differential potential is generated between the bit line pair BLT and BLN, and a potential difference having a full amplitude (0.8 V to 1 V) is generated between the main input/output line pair MIOT and MION. When the column selection signal YSW becomes "1", the potential of the bit line BLT and the potential of the bit line BLN become potentials corresponding to potentials of the main input/output line pair MIOT and MION. When the potential of the word line WL becomes "0", the main input/output line MIOT is precharged, so that the state of the main input/output line pair MIOT and MION is reset.

After both the end of the read cycle and the end of the write cycle, the main input/output line pair MIOT and MION always becomes a reset state. Hence, there is an advantage in that a next cycle can be started from a state in which the state of the main input/output line pair MIOT and MION is the same.

Figure 4:
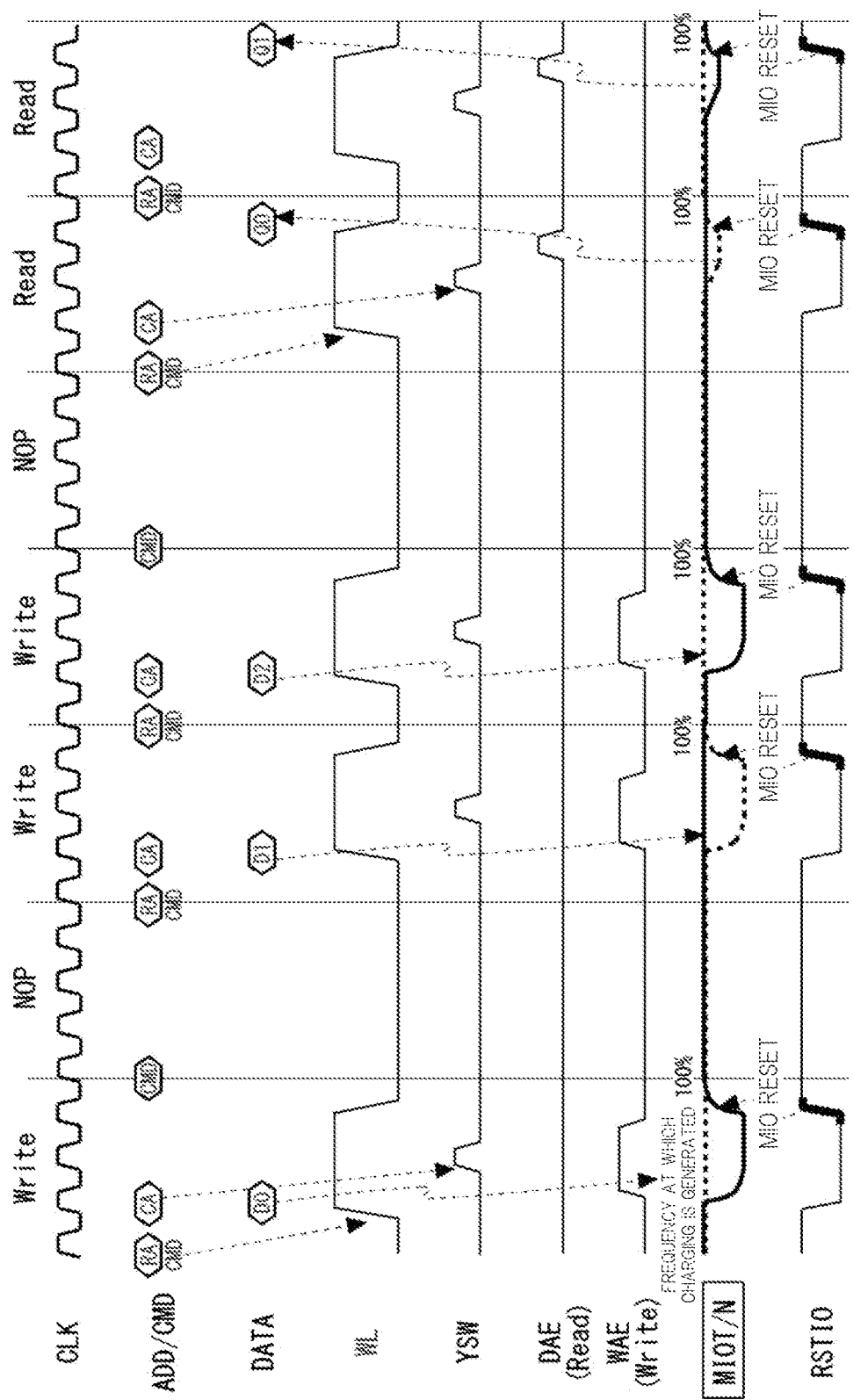
FIG. 4 is an explanatory diagram showing the operation of resetting the pair of main input/output lines in detail.

FIG. 4 is a time chart showing the operation of resetting the main input/output line pair MIOT and MION in more detail. The time chart indicates variation in a clock CLK, address/command signals ADD/CMD, the data signal DATA, and the potential of the word line WL. Note that the potential of the word line WL can also be said to be a potential of a word line WL selecting signal. The time chart indicates variation in the column selection signal YSW, a data amplifier enable signal DAE, a write amplifier enable signal WAE, the potential of the main input/output line pair MIOT and MION, and a reset signal RSTIO.

With reference to the address command signals ADD/CMD, first, a row address RA and a write command CMD are input. When the row address RA is input, the potential of the word line WL becomes "1", and the write amplifier enable signal WAE becomes "1". Then, when the column address CA is input, the column selection signal YSW becomes "1".

With reference to the data signal DATA, when the column address CA is input, data D (e.g., data D0, data D1, or data D2) is simultaneously input. According to the data D, the potential difference between the main input/output line pair MIOT and MION becomes a full amplitude. When the write enable signal WAE becomes "0", the reset signal RSTIO becomes "1", and the state of the main input/output line pair MIOT and MION is reset. At this time, current consumption for charging the main input/output line MIOT or the main input/output line MION is generated. A frequency at which charging is generated in the write cycle is 100%.

In the read cycle, the row address RA, the read command CMD, and the column address CA are input. When the column address CA is input, the column selection signal YSW becomes "1". The differential potential is generated between the main input/output line pair MIOT and MION. When the column selection signal YSW becomes "0", the data amplifier enable signal DAE becomes "1", and the differential potential between the main input/output line pair MIOT and MION is amplified. Data Q (e.g., Q0 or Q1) read out from the amplified differential potential is output as the data signal DATA. When the column selection signal YSW becomes "0", the reset signal RSTIO becomes "1", and the state of the main input/output line pair MIOT and MION is reset. That is, the main input/output line MIOT or MION is charged to a level same as that of the power supply potential VDD. At this time, current consumption for charging the main input/output line MIOT or the main input/output line MION is generated. Also in the read cycle, a frequency at which charging is generated is 100%. Note that, however, in the read cycle, the potential difference between the main input/output line pair MIOT and MION is small, and accordingly, the current consumption generated in the read cycle is smaller than the current consumption generated in the write cycle.

Thus, after the end of the write cycle and after the column selection in the read cycle, the state of the main input/output line pair MIOT and MION is reset. After the end of the write cycle, the main input/output line pair MIOT and MION between which the potential difference having a full amplitude is generated is required to be reset, thereby causing a large current consumption.

Next, an example in which a CAS operation is executed multiple times will be described. Reading or writing bulk data is more advantageous in terms of data transfer rate and power consumption. Note that, however, these advantages are limited to a case of accessing the same row address.

Figure 5:
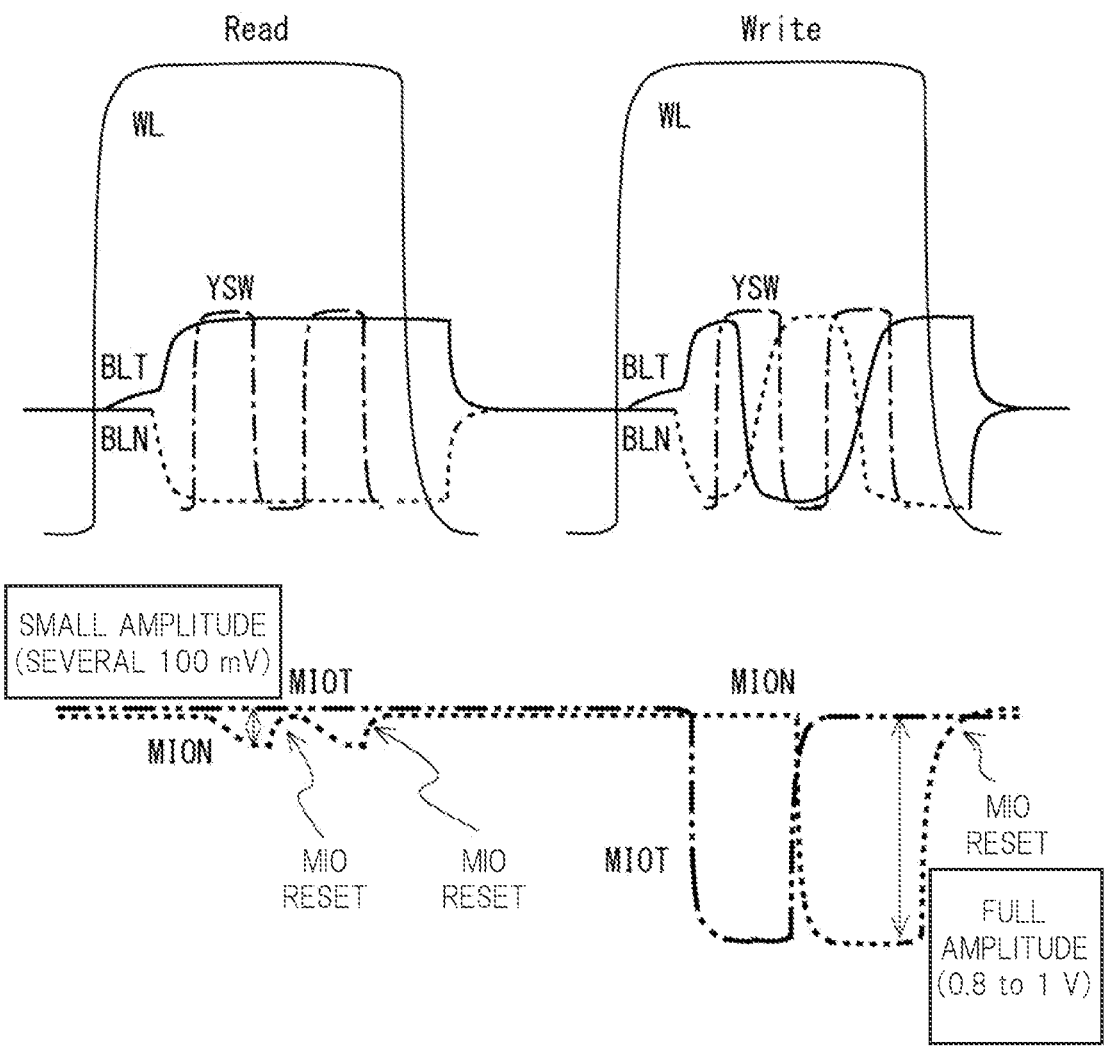
FIG. 5 is an explanatory diagram showing the operation of resetting the pair of main input/output lines, in a case in which a CAS operation is executed multiple times.

FIG. 5 is an explanatory diagram showing the operation of precharging the main input/output line pair MIOT and MION, in a case in which a CAS operation is executed multiple times (e.g., twice). In the read cycle, for every column selection, the state of the main input/output line pair MIOT and MION is reset. In contrast, in the write cycle, at the end of the write cycle, the state of the potential difference between the main input/output line pair MIOT and MION is reset.

Figure 6:
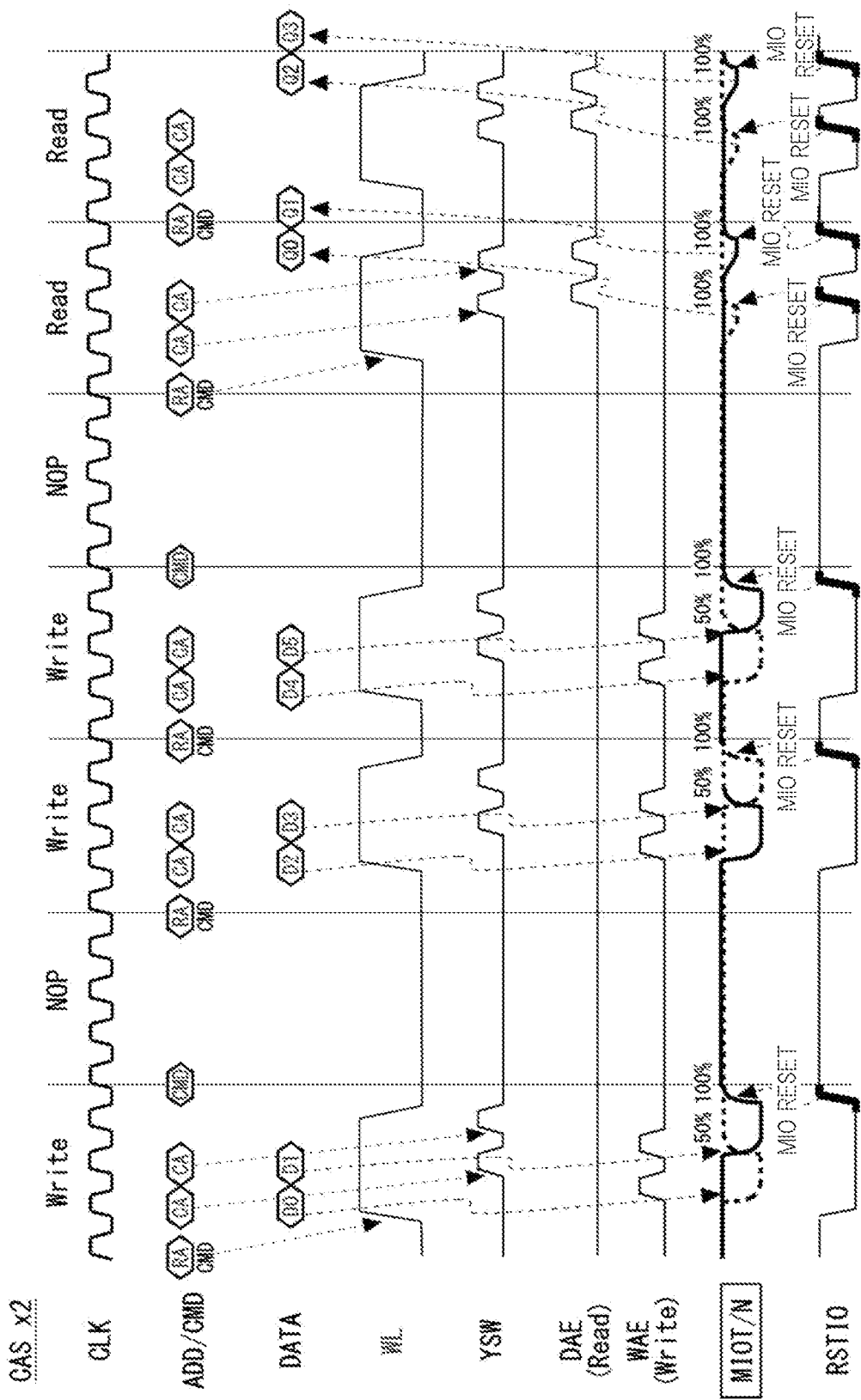
FIG. 6 is an explanatory diagram showing the operation of resetting the pair of main input/output lines in detail, in a case in which the CAS operation is executed multiple times.

FIG. 6 is an explanatory diagram showing, in more detail, the operation of precharging the main input/output line pair MIOT and MION, in the case in which the CAS operation is executed multiple times. The column address CA is input twice in the write cycle. For every column selection, the data D (e.g., D0, D1, D2, D3, D4, or D5) is input. The reset signal RSTIO becomes "1" at the end of the write cycle, and the state of the main input/output line pair MIOT and MION is reset. At this time, current consumption for charging the main input/output line MIOT or the main input/output line MION is generated. A frequency at which charging is generated in the write cycle is 100%.

In contrast, after the potential of the main input/output line pair MIOT and MION is caused to fluctuate according to the data (e.g., D0, D2, or D4) input in the first CAS operation, the reset signal RSTIO does not become "1". In a case in which the data (e.g., D1, D3, or D5) input in the second CAS operation and the data input in the first CAS operation are identical to each other, the potential of the main input/output line MIOT and the potential of the main input/output line MION are held. Then, in a case in which the data input in the second CAS operation and data input in the first CAS operation are different from each other, the potential of the main input/output line MIOT and the potential of the main input/output line MION are inverted. In this case, current consumption for charging the main input/output line MIOT or the main input/output line MION is required. A frequency at which charging is generated between the first CAS operation and the second CAS operation is 50%.

Even in the read cycle, the column address CA is input twice. For every column selection, the data Q (e.g., Q0, Q1, Q2, or Q3) is read out. The state of the main input/output line pair MIOT and MION is reset for every column selection by the reset signal RSTIO.

Also in the case of executing the CAS operation multiple times, at the end of the write cycle, the state of the main input/output line pair between which the potential difference having a full amplitude is generated is required to be reset, thereby causing a large current consumption.

Figure 7:
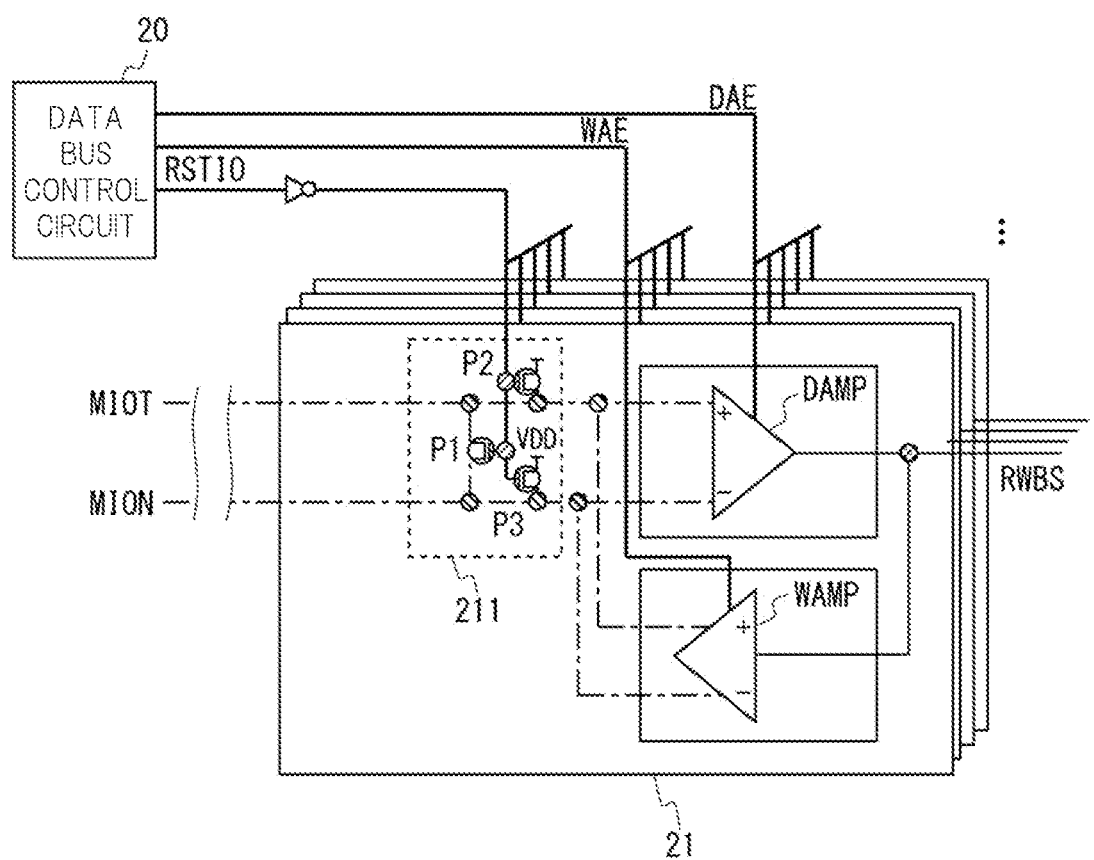
FIG. 7 is a diagram showing a configuration of a typical DRAM circuit.

FIG. 7 is a diagram showing a configuration of a typical DRAM circuit 100. The DAMP/WAMP 21 includes a data amplifier DAMP, a write amplifier WAMP, and a reset circuit 211. The data amplifier DAMP amplifies the potential difference between the main input/output line pair MIOT and MION to output the amplified potential difference to a read/write bus RWBS. An input terminal of the WAMP is connected to the read/write bus RWBS and, according to a signal from the read/write bus RWBS, the WAMP causes the potential difference between the main input/output line pair MIOT and MION to have a full amplitude.

The reset circuit 211 includes a pMOS transistor P1, a pMOS transistor P2, and a pMOS transistor P3. A source and a drain of the pMOS transistor P1 are connected to the main input/output line MIOT and the main input/output line MION, respectively. A source and a drain of the pMOS transistor P2 are connected to the main input/output line MIOT and a power supply potential VDD, respectively. A source and a drain of the pMOS transistor P3 are connected to the main input/output line MION and the power supply potential VDD, respectively. A gate of the pMOS transistor P1, a gate of the pMOS transistor P2, and a gate of the pMOS transistor P3 each receive an input of the reset signal RSTIO. When the reset signal RSTIO is input, the main input/output line pair MIOT and MION are precharged, so that the state of the main input/output line pair MIOT and MION is reset.

Note that the main input/output line MIOT, the main input/output line MION, the data amplifier DAMP, the write amplifier WAMP, and the reset circuit 211 are provided for each of the main input/output line pairs.

The data bus control circuit 20 outputs, to the data amplifier DAMP, the data amplifier enable signal DAE. The data bus control circuit 20 outputs, to the write amplifier WAMP, the write amplifier enable signal WAE. The data bus control circuit outputs, to the gates of the pMOS transistors P1, P2, and P3, the reset signal RSTIO.

In the read cycle, the differential potential having a small amplitude between the main input/output line pair MIOT and MION is amplified by the data amplifier DAMP to output the amplified differential potential to the read/write bus RWBS. After the data is read out, the reset signal RSTIO causes the state of the main input/output line pair MIOT and MION to be reset.

In the write cycle, according to the data input to the read/write bus RWBS, the write amplifier WAMP causes the potential difference between the main input/output line pair MIOT and MION to have a full amplitude. After the end of the write cycle, the reset signal RSTIO causes the state of the main input/output line pair MIOT and MION to be reset.

In recent years, as a cash memory for use in AI and a mobile device, use of a custom DRAM has been demanded. In such a custom DRAM, a frequency of switching a row address by a random access is high. Accordingly, it is difficult to reduce power loss by executing the CAS operation multiple times. Moreover, a multi-bit high-speed operation is required in the DRAM, causing a large power loss attributable to data transfer.

The inventors of the present application conceive of embodiments on the basis of the foregoing study. The embodiments according to the present application will be described below.

First Embodiment

Figure 8:
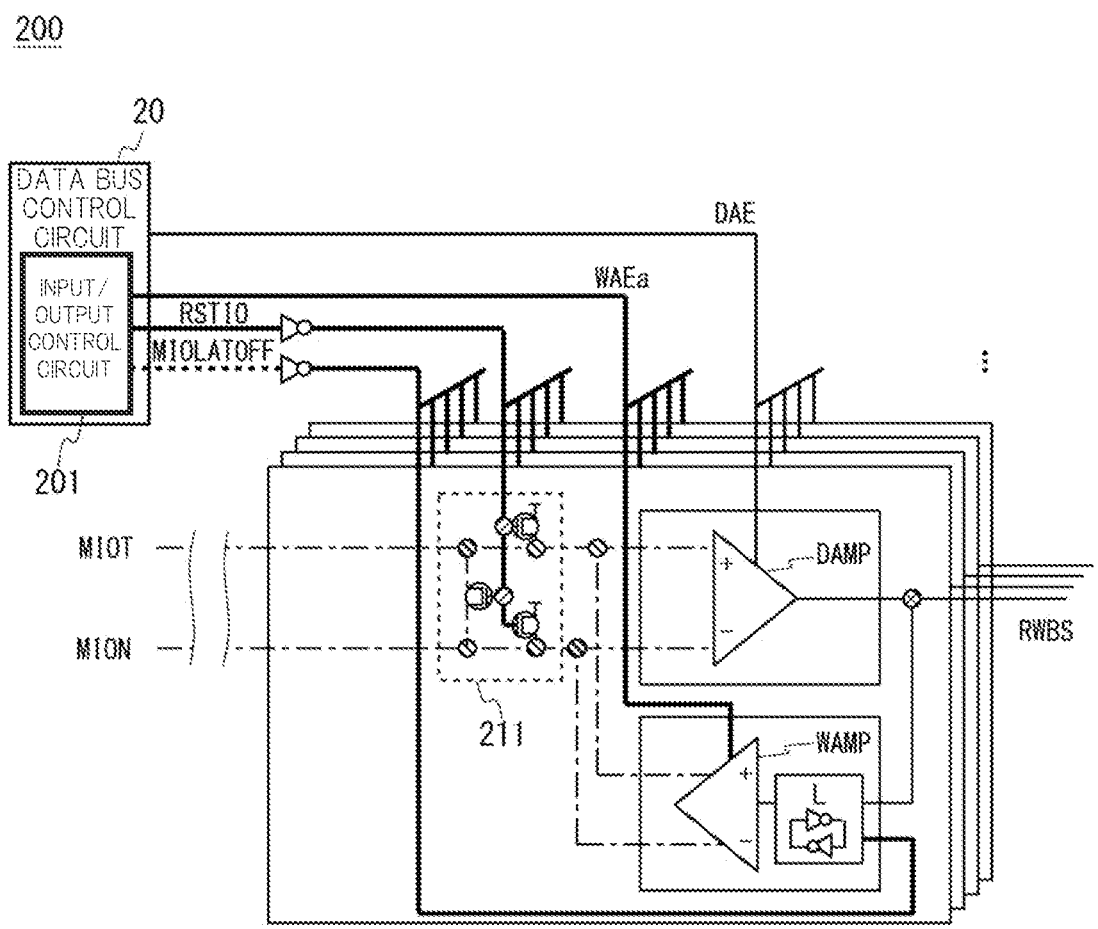
FIG. 8 is a diagram showing a configuration of a DRAM circuit according to a first embodiment.

FIG. 8 is a diagram showing a configuration of a DRAM circuit 200 according to a first embodiment. Comparing FIG. 8 with FIG. 7, a latch circuit L is added in FIG. 8, and an input/output control circuit 201 is added to the data bus control circuit 20 in FIG. 8.

The latch circuit L is disposed between an input terminal of the write amplifier WAMP and the read/write bus RWBS. The latch circuit L latches data input on the read/write bus RWBS in the write cycle. When a latch-off signal MIOLATOFF of "1" is input from the input/output control circuit 201, the latch circuit L is released, and the data on the read/write bus RWBS is transferred to a section beyond the latch circuit L.

The write amplifier WAMP causes the potential difference between the main input/output line pair MIOT and MION to have a full amplitude, according to the data latched by the latch circuit L. Accordingly, the state of the main input/output line pair MIOT and MION is held.

The input/output control circuit 201 inputs a write enable signal WAEa to the write amplifier WAMP. The write enable signal WAEa causes an operation of the write amplifier WAMP to stop in the read cycle. Accordingly, although the latch circuit L is not released, the state of the main input/output line pair MIOT and MION is not held.

The input/output control circuit 201 outputs the reset signal RSTIO to the reset circuit 211. As in the conventional technique, the reset circuit 211 resets the state of the main input/output line pair MIOT and MION after column selection in the read cycle. The reset circuit 211 further resets the state of the main input/output line pair MIOT and MION at the start of the read cycle.

The input/output control circuit 201 inputs the latch-off signal MIOLATOFF to the latch circuit L. The latch circuit L is released when data from the read/write bus RWBS is transmitted beyond the latch circuit L in the write cycle.

The write amplifier WAMP and the latch circuit L allow the state of the main input/output line pair MIOT and MION to be held in a period from the end of the write cycle to the start of the first read cycle after the write cycle or in a period from the end of the write cycle to the start of the first write cycle after the write cycle. In the first read cycle after write cycle, an operation of the write amplifier is stopped, and the state of the main input/output line pair MIOT and MION is reset. In the write cycle, the latch circuit L is released.

Figure 9:
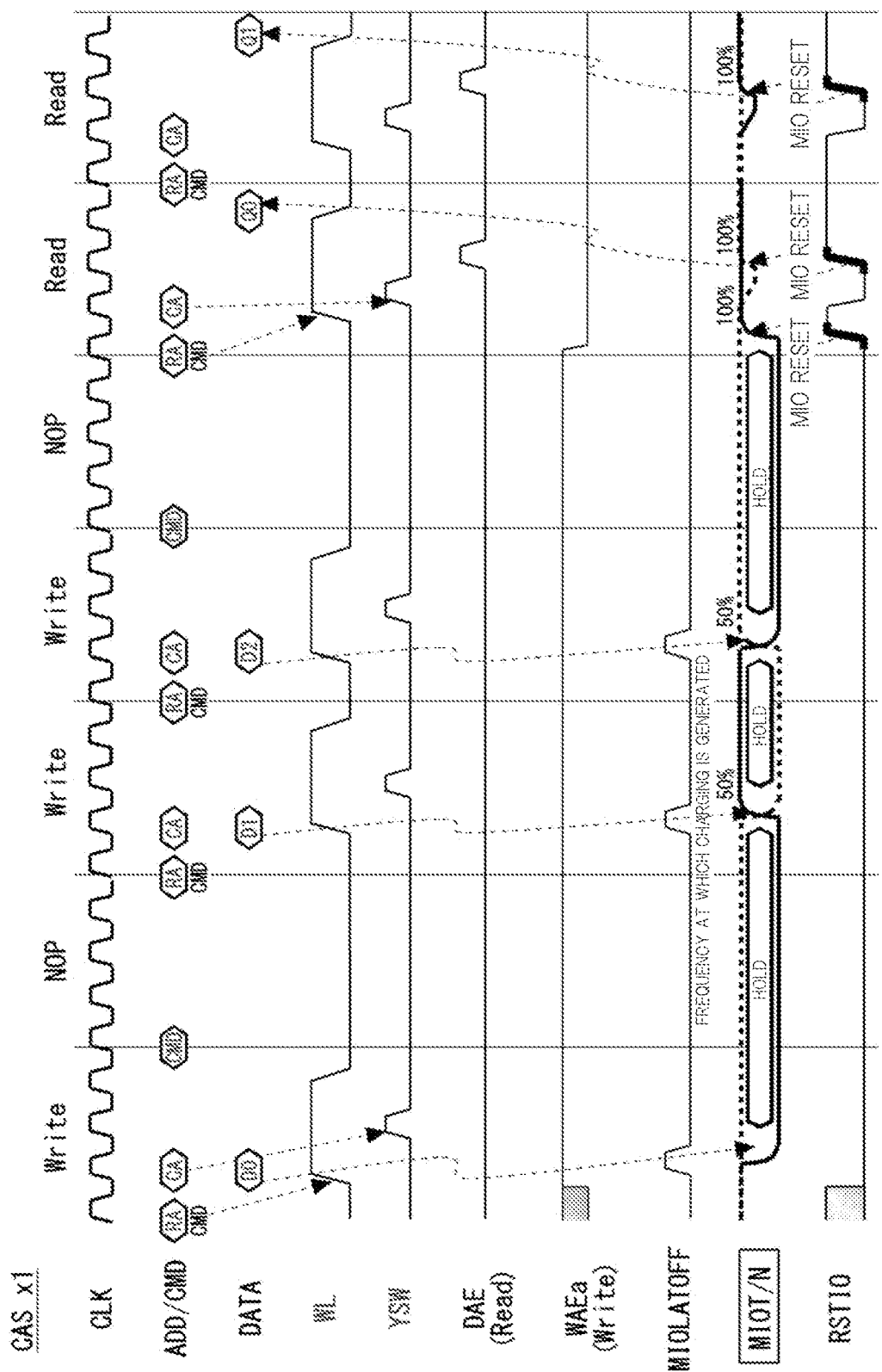
FIG. 9 is a diagram showing an operation of a DRAM circuit according to the first embodiment.

FIG. 9 is a diagram showing an operation of the DRAM circuit 200 according to the first embodiment. Comparing FIG. 9 with FIG. 4, in FIG. 9, the write enable signal WAEa becomes "1" in the cycles other than the read cycles. This is a difference between FIG. 4 and FIG. 9. Hence, the potential of the main input/output line pair MIOT and MION can be held.

Also, the latch-off signal MIOLATOFF is added in FIG. 9. The latch-off signal MIOLATOFF becomes "1" when the potential of the main input/output line pair MIOT and MION is caused to fluctuate in the write cycle. Owing to this, the latch circuit L can transmit the data on the read/write bus RWBS to the main input/output line pair MIOT and MION.

Then, the reset signal RSTIO does not become "1" for every write cycle. Hence, the state of the main input/output line pair MIOT and MION is not reset, and the potential of the main input/output line pair MIOT and MION is held.

Whereas the state of the main input/output line pair MIOT and MION is not reset for every write cycle, the reset signal becomes "1" at the beginning of the read cycle, and the state of the main input/output line pair MIOT and MION is reset. Moreover, as in the conventional technique, after column selection in the read cycle, the reset signal RSTIO becomes "1".

Next, variation in potential of the main input/output line pair MIOT and MION will be described. In the first write cycle, the potential of the main input/output line pair MIOT and MION fluctuates, in a No Operation (NOP) cycle, the potential of the main input/output line pair MIOT and MION is held.

When the latch-off signal MIOLATOFF becomes "1" in the next write cycle, according to data input onto the read/write bus RWBS, the state of the main input/output line pair MIOT and MION can fluctuate. For example, in a case in which the data input onto the read/write bus RWBS becomes "0", the potential of the main input/output line MIOT and the potential of the main input/output line MION remain "0" and "1", respectively, and current consumption is not generated. Conversely, in a case in which the data input onto the read/write bus RWBS is "1", the potential of the main input/output line MIOT and the potential of the main input/output line MION become "1" and "0", respectively. In this case, charging current for causing the potential of the main input/output line MIOT to be "1" is required. In a case in which a probability that the data input onto the read/write bus RWBS is "0" is 50%, it is estimated that a frequency at which charging is generated also becomes 50%. Hence, according to the first embodiment, it is possible to reduce the charging current for the main input/output line pair MIOT and MION.

Figure 10:
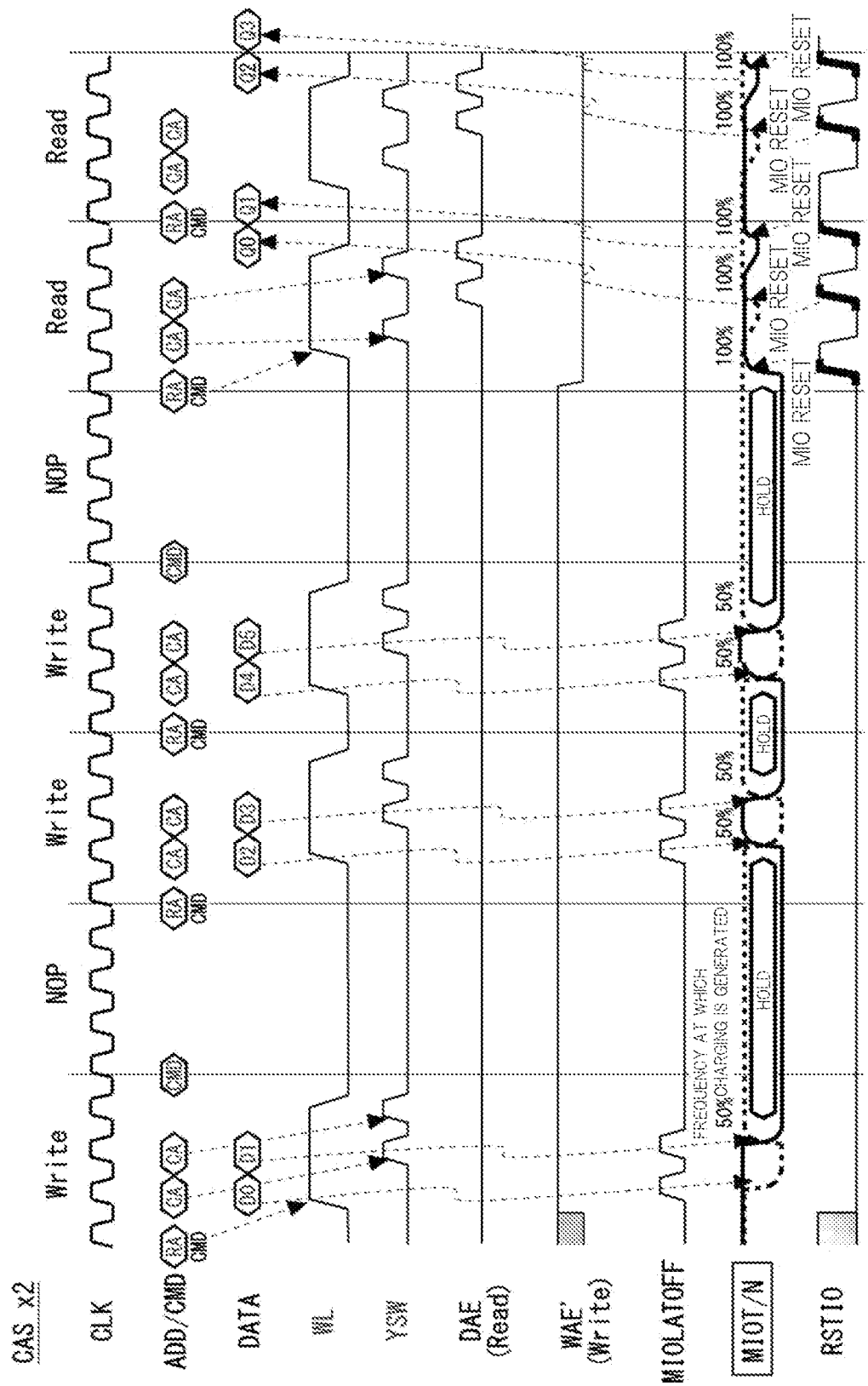
FIG. 10 is an explanatory diagram showing an operation of executing a CAS operation multiple times by the DRAM circuit according to the first embodiment.

FIG. 10 is an explanatory diagram showing an operation of executing a CAS operation multiple times by the DRAM circuit 200 according to the first embodiment. Comparing FIG. 10 with FIG. 9, in FIG. 10, the latch-off signal MIOLATOFF becomes "1" twice during one write cycle.

It is assumed that, in the first CAS operation in the write cycle, the potential of the main input/output line MIOT and the potential of the main input/output line MION fluctuate to "1" and "0", respectively. In this case, in the second CAS operation in the write cycle, a frequency at which the state of the main input/output line pair MIOT and MION is 50%. Moreover, the state of the main input/output line pair MIOT and MION is held until the start of the next write cycle or until the start of the next read cycle. In the next write cycle, a frequency at which the state of the main input/output line pair MIOT and MION varies is 50%.

At the start of the read cycle, the reset signal RSTIO causes the state of the main input/output line pair MIOT and MION to be reset. In addition, as in the conventional technique, after column selection, the state of the main input/output line pair MIOT and MION is reset.

Thus, also in a case in which the CAS operation is executed multiple times, when the write data is unchanged during a period from the end of the write cycle to the start of the next write cycle after the write cycle, it is possible to reduce charging current for the main input/output line pair MIOT and MION.

The DRAM circuit 200 according to the first embodiment can reduce charging current for the main input/output line pair MIOT and MION, in a case in which the write cycle is continuous and the write data is the same. Note that a cycle other than the read cycle (e.g., a NOP cycle or a refresh cycle) may be interposed between the write cycle and the next write cycle. In a case in which it is supposed that a data toggle rate is 50% and a write operation is executed on average three consecutive times, the first embodiment achieves reduction in current consumption by approximately 30%.

As a secondary effect, the first embodiment can reduce heat generation owing to reduction in power. Moreover, the first embodiment achieves reduction in noise by decreasing a switching frequency of the bus and improves reliability of the bus lines, so that a freedom of wiring layout can be enhanced.

Second Embodiment

A second embodiment is a modification of the first embodiment. In the first embodiment, the latch circuit L is disposed on an input side of the write amplifier WAMP. However, in the second embodiment, the latch circuit L directly latches the potential of the main input/output line MIOT and the potential of the main input/output line MION.

Figure 11:
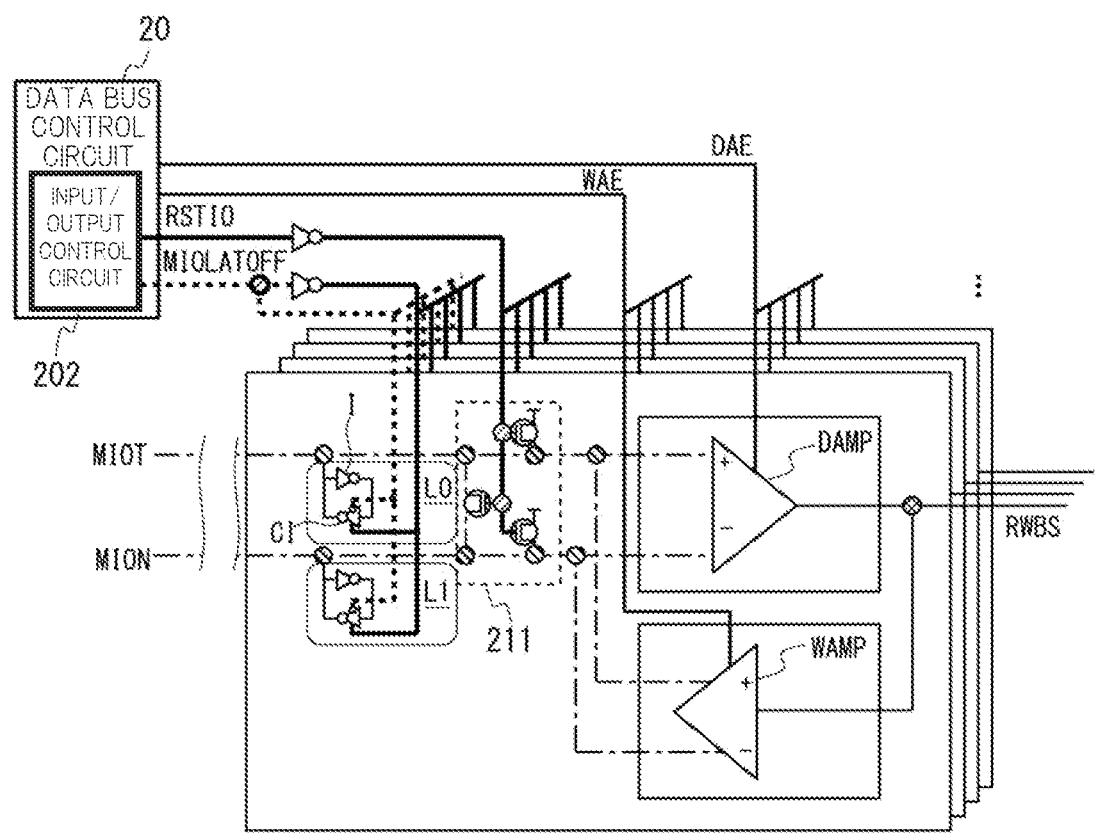
FIG. 11 is a diagram showing a configuration of a DRAM circuit according to a second embodiment.

FIG. 11 is a diagram showing a configuration of a DRAM circuit 200a according to the second embodiment. Comparing FIG. 11 with FIG. 8, in FIG. 11, the latch circuit L is replaced with a latch circuit L0 and a latch circuit L1. In addition, the input/output control circuit 201 is replaced with an input/output control circuit 202 in FIG. 11.

The latch circuits L0 and L1 are latch circuits each using, for example, a clocked inverter. Each of the latch circuits L0 and L1 includes an inverter I and a clocked inverter CI. An output of the inverter I is input to the clocked inverter CI, and an output of the clocked inverter CI is input to the inverter I. The output of the clocked inverter CI included in the latch circuit L0 is connected to the main input/output line MIOT. Similarly, the output of the clocked inverter CI included in the latch circuit L1 is connected to the main input/output line MION.

Signals obtained by inverting the latch off signal MIOLATOFF and the latch off signal MIOLATOFF are input to the clocked inverter CI. When the latch off signal MIOLATOFF indicated with a dash line is "1", the clocked inverter CI is switched off, and the latch circuits L0 and L1 are released.

The input/output control circuit 202 does not supply the write enable signal WAEa to the write amplifier WAMP. In the second embodiment, as in the conventional technique, the data bus control circuit 20 supplies the write enable signal WAE to the write amplifier WAMP. In the second embodiment, the number of control signals to be newly generated in the input/output control circuit 202 can be reduced. In other words, the conventional write enable signal WAE can also be used. Note that, however, a load of the main input/output line pair MIOT and MION in the second embodiment is greater than a load of the main input/output line pair MIOT and MION in the first embodiment.

Also in the second embodiment, the same advantages as those of the first embodiment are provided. Moreover, according to the second embodiment, the number of control signals to be newly generated can be reduced.

Third Embodiment

Figure 12:
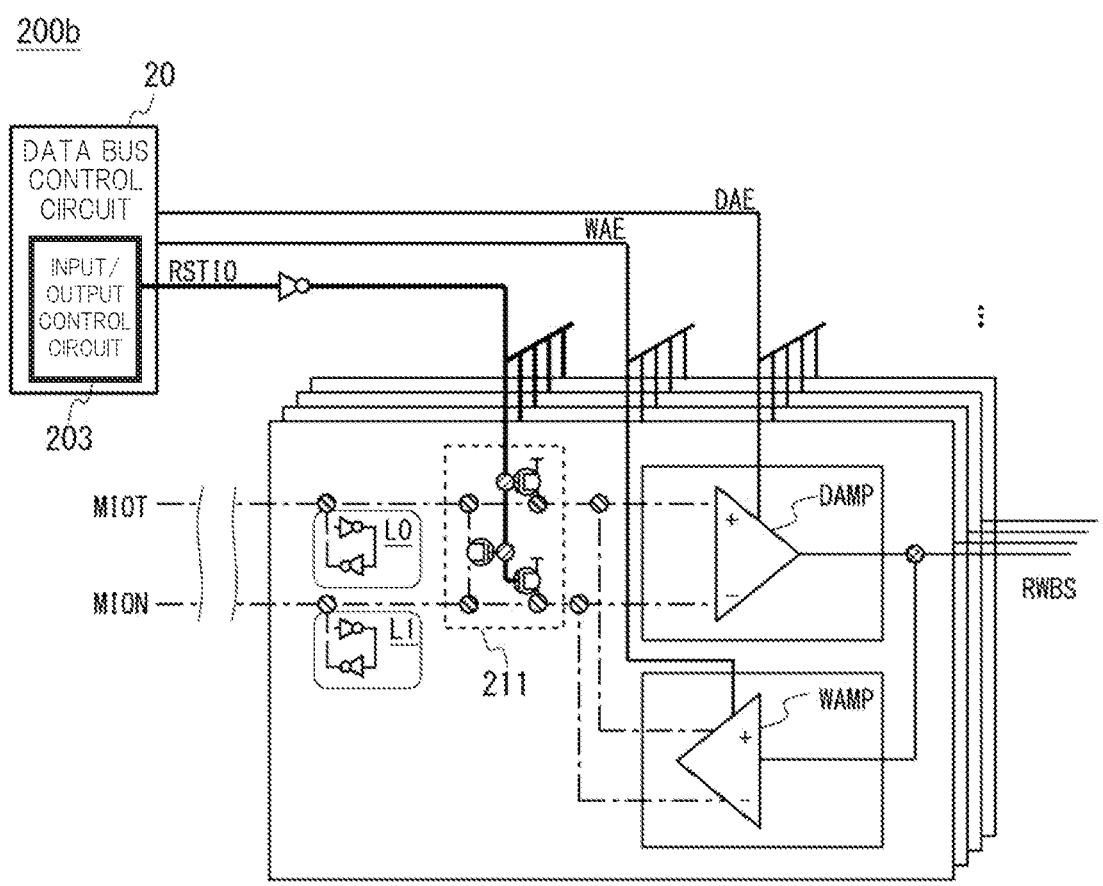
FIG. 12 is a diagram showing a configuration of a DRAM circuit according to a third embodiment.

A third embodiment is a modification of the second embodiment. FIG. 12 is a diagram showing a configuration of a DRAM circuit 200b according to the third embodiment. Comparing FIG. 12 with FIG. 11, in FIG. 12, the input/output control circuit 202 is replaced with an input/output control circuit 203. The input/output control circuit 203 does not output the latch-off signal MIOLATOFF. Also, a driving force of each of the latch circuits LT0 and LT1 is designed to be low such that fluctuation of the potential of the main input/output line pair MIOT and MION is not hindered as much as possible.

In the third embodiment, it is possible to reduce the number of control signals generated in the input/output control circuit 203. Note that, however, the load generated at a time of causing the potential of the main input/output line pair MIOT and MION to fluctuate is increased.

Also in the third embodiment, the same advantages as those of the first embodiment are provided. Moreover, according to the third embodiment, the number of control signals newly generated can further be reduced.

Fourth Embodiment

Figure 13:
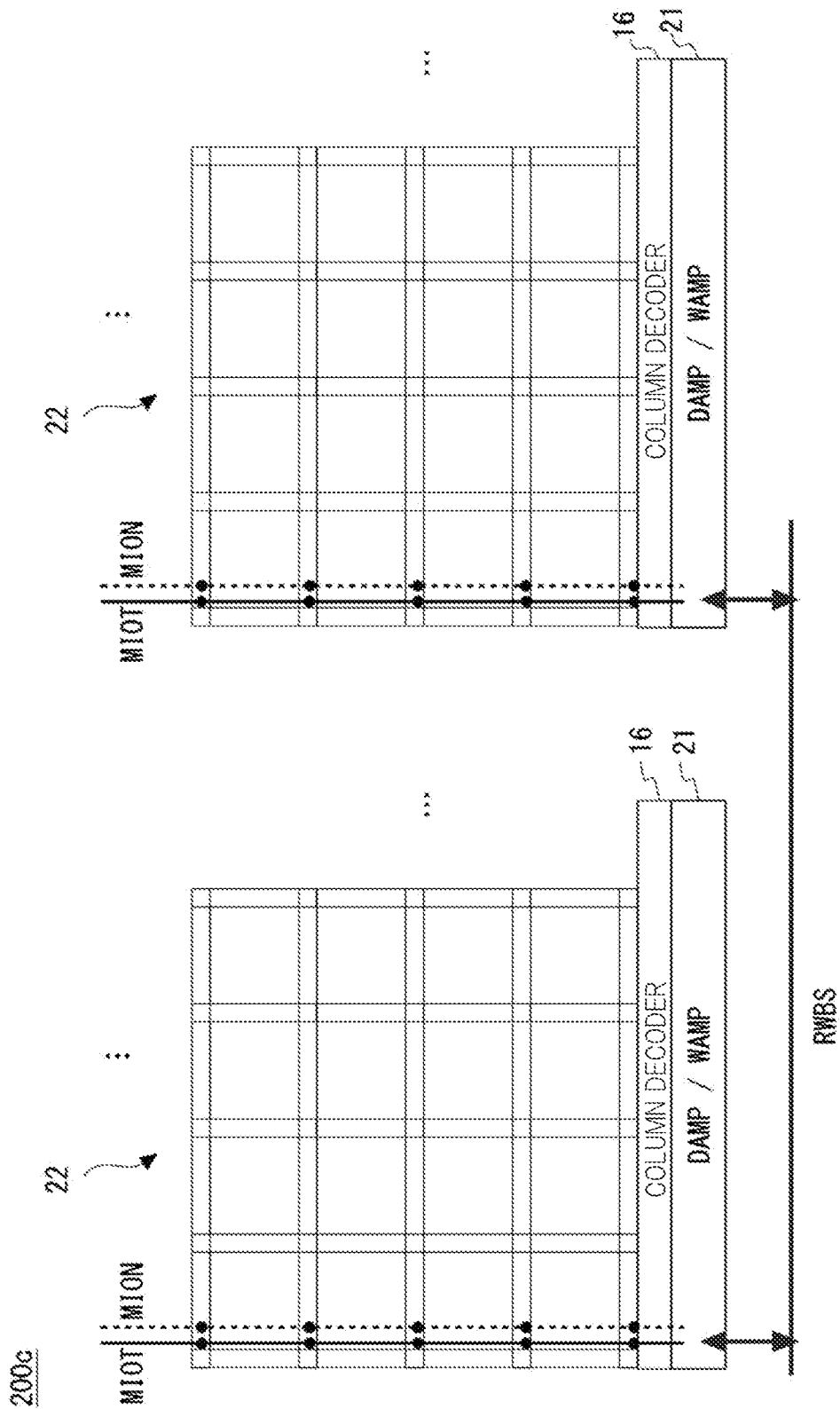
FIG. 13 is a diagram showing a configuration of a DRAM circuit according to a fourth embodiment.

FIG. 13 is a diagram showing a configuration of a DRAM circuit 200c according to a fourth embodiment. The DRAM circuit 200c includes a plurality of cell plates 22, and a read/write bus RWBS shared among the plurality of cell plates 22. Also, in FIG. 13, a column decoder 16 and a DAMP/WAMP 21 are included in each of the cell plates 22. A reset circuit (not illustrated) is included in the DAMP/WAMP 21. That is, the reset circuit is included in each of the cell plates 22.

Each of the cell plates 22 includes the main input/output line pair MIOT and MION. The reset circuit resets the state of the main input/output line pair MIOT and MION for each of the cell plates 22.

In the fourth embodiment, the state of the main input/output line pair can be controlled for each cell plate, so that current consumption can be more flexibly and efficiently reduced.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the DRAM circuit according to the foregoing embodiments, such a configuration that a conductivity type (p-type or n-type) of a semiconductor substrate, a semiconductor layer, a diffusion layer (diffusion region), or the like may be inverted. Thus, in a case in which either one of the n-type and p-type conductivity type is set as a first conductivity type and the other one is set as a second conductivity type, the first conductivity type can also be the p-type, and the second conductivity type can also be the n-type. Conversely, the first conductivity type can also be the n-type, and the second conductivity type can also be the p-type.

What is claimed is:

1. A dynamic random access memory (DRAM) circuit comprising:
    a differential main input/output line pair; and
    a reset circuit, wherein:
    i) a potential difference of the differential main input/output line pair is held at a first data value in a first period from an end of a write cycle to a start of a first write cycle after the write cycle; or
    ii) a potential difference of the differential main input/output line pair is held at a second data value in a second period from the end of the write cycle to a start of a first read cycle after the write cycle so that the reset circuit resets a state of the differential main input/output line pair at the start of the first read cycle such that each line of the differential main input/output line pair is at a same potential at the start of the first read cycle.

2. The DRAM circuit according to claim 1, wherein, in the write cycle, a column address strobe (CAS) operation is sequentially executed.

3. The DRAM circuit according to claim 1, comprising:
    a latch circuit that holds data input to a read/write bus in the write cycle;
    a write amplifier that amplifies the data held in the latch circuit to output the amplified data to the differential main input/output line pair; and
    a data bus control circuit that releases the latch circuit in the first write cycle, to stop an operation of the write amplifier in the first read cycle.

4. The DRAM circuit according to claim 1, further comprising:
    a latch circuit that holds the potential of each main input/output line of the differential main input/output line pair.

5. The DRAM circuit according to claim 1, comprising:
    a plurality of cell plates each including the differential main input/output line pair; and
    a data bus that is shared among the plurality of cell plates,
    wherein the reset circuit resets the state of the differential main input/output line pair for each of the cell plates.

* * * * *